Nov. 21, 1967   L. W. GAMBLE ET AL   3,354,317
RADIATION SENSITIVE APPARATUS AND METHOD FOR ANALYZING
MOLECULAR WEIGHT DISTRIBUTION IN POLYMERIC MATERIAL
Filed Aug. 17, 1964                      3 Sheets-Sheet 1

INVENTORS
LEON W. GAMBLE
TRENT LANE

BY
*Edwin M. Thomas*
ATTORNEY

INVENTORS
LEON W. GAMBLE
TRENT LANE

BY *[signature]*

ATTORNEY

Nov. 21, 1967 L. W. GAMBLE ETAL 3,354,317
RADIATION SENSITIVE APPARATUS AND METHOD FOR ANALYZING
MOLECULAR WEIGHT DISTRIBUTION IN POLYMERIC MATERIAL
Filed Aug. 17, 1964 3 Sheets-Sheet 3

INVENTORS
LEON W. GAMBLE
TRENT LANE
BY Edwin M. Thomas
ATTORNEY

United States Patent Office 3,354,317
Patented Nov. 21, 1967

3,354,317
RADIATION SENSITIVE APPARATUS AND METHOD FOR ANALYZING MOLECULAR WEIGHT DISTRIBUTION IN POLYMERIC MATERIAL
Leon Walter Gamble, Baton Rouge, and Trent Lane, Baker, La., assignors to Esso Research and Engineering Company, a corporation of Delaware
Filed Aug. 17, 1964, Ser. No. 390,080
6 Claims. (Cl. 250—218)

ABSTRACT OF THE DISCLOSURE

The instant application discloses a method and instrument for determining the distribution of various fractions of different molecular weight in a polymer. This distribution is determined by dissolving the polymer in a solvent/non-solvent mixture and then cooling to selectively precipitate first the heaviest and then on to the lightest polymer fractions and measuring the increase in turbidity of the solution as a measure of the molecular weight distribution.

---

The present invention relates to an apparatus and a method for chemical analysis and the like, especially for analyzing molecular weight distribution in polymeric material. It relates more particularly to a simple method and apparatus for characterizing such attributes as the molecular weight distribution, or polydispersity, or organic materials. It is well suited, in a preferred embodiment, to analysis of molecular weight components, or their distribution in polyolefins, for example, in polyethylene, polypropylene, copolymers of ethylene and propylene, and other materials of similar nature.

There has long been a need for a rapid method of determining the molecular weight distribution of polymeric materials. Experimental methods employed in the past have usually involved the separation of the whole polymer into fractions. This has been done in order to obtain portions or fractions that are more homogeneous in molecular weight than the original material. Processes of this type, involving fractionation according to molecular weight, may be performed in various ways. For example, actual fractions may first be isolated physically and their properties examined individually. This may be called a preparative method. It involves isolation of separate portions into ranges or bands of molecular weight. On the other hand, a different analytical method may be used in which separation, in a sense, is progressive, or in which distribution curves for the various components, distinguished by molecular weight, are obtained without actually isolating the individual fractions. Although the particular embodiment of the invention disclosed herein is concerned primarily with determinations of molecular weight distribution in polymers, the invention is not necessarily limited thereto. The invention, in some of its aspects, has utility wherever a change of phase in a mixture of materials causes significant chanegs in light transmission. Thus it may be used to measure light transmission, or to detect changes in such transmission, (1) when solids appear in a liquid to cause turbidity, (2) when two immiscible liquids become miscible (e.g., in determining the aniline point, a common procedure), or when solids previously suspended go into solution, as, for example, in preparation of silver compounds, such as diamino silver chloride by solution of AgCl as the complex $Ag(NH_3)_2Cl$, etc. The apparatus and method may be used for determining characteristics of small suspended solid particles, e.g., to determine particle size by observing the rate of sedimentation.

The problem of determining molecular weight distribution in polymers illustrates the principle of the invention quite well and it will therefore be further discussed.

While several different schemes have been employed for fractionation of polymeric samples of various kind, nearly all that have been successful are based on the differences in solubilities of different molecular weight species in a solvent/non-solvent system. As a general rule, the lowest molecular weight species are the most soluble, and those of higher molecular weight will be precipitated first. This occurs, for example, when a saturated solution is cooled. The present invention is applicable particularly to this general scheme of analysis. It involves the so-called turbidimetric technique. In this technique the degree to which a dissolved component is precipitated out of solution is determined by the turbidity of the solution, measured comparatively as the precipitation takes place. In a typical analysis, the material for study is first dissolved in an organic solvent, preferably one in which its solubility is marginal. In order to accomplish the dissolution it may be necessary to raise the temperature of the solution. Thereafter, various fractions or components are forced out of solution one after another to form a suspension which increases in turbidity as the cooling proceeds. Precipitation occurs, of course, as the solvent is cooled, the least soluble component being precipitated first and the most soluble component being precipitated last. In the sense here used, precipitation means separation of polymer from solution but without substantial settling, i.e., as a solid which remains suspended.

According to the present invention, the molecular weight distribution of a given sample of polymeric material can be determined quite fully and accurately by simply dissolving the sample in a solvent and cooling it at a predetermined rate, while observing the precipitation as it progresses. The solvent must be one in which the material on the whole is relatively soluble at elevated temperatures and relatively insoluble at lower temperatures. By placing a solution of this character first at elevated temperature in a tube or container which is transparent in some area, light may be passed through the container and through the solution therein. Then by progressively lowering the temperature of the solution in the tube at a controlled rate, the increasing turbidity of the solution is measured periodically and the measurements are tabulated alongside the temperatures, stepwise. Turbidity increases, of course, as the various molecular weight fractions of the original sample come out of solution. It is a particular object of this invention to devise a simple apparatus and method for accomplishing this result.

In order to obtain meaningful data, the materials precipitated must remain in suspension in the liquid, so that the turbidity will be proportional, or essentially so, at all times to the amount of precipitate separated from the liquid. Some materials may give no trouble with settling but others may require frequent or continuous agitation. Hence another feature of the present invention provides for adequate agitation of the solution or suspension during the test when such is required. The agitation means may not need to be operated in many cases to prevent settling of the precipitate. It is nevertheless very useful, in most cases, to insure proper homogeneity of the solution at the beginning of the test.

A further and specific object of the invention is to devise a simple but reliable system whereby changes in temperature of the materials being studied may be systematically controlled and recorded simultaneously with changes in the turbidity resulting from such temperature changes.

In the prior art, the turbidimetric technique has sometimes been used, employing a titration approach to fractionation. A method of this type is fairly rapid, but is not sufficiently accurate in many cases. In some cases it is quite inaccurate. As a quantitative analytical procedure, it has not been very satisfactory on the whole. It has been found, for example, that differences in the refractive indices of solvent and non-solvent, e.g. in solutions of polymer, result in poor reproducibility. Also, the precipitates may swell, or may coagulate and form a gel; the precipitation rate may be varied, or the particles in the precipitant may change in size.

Some investigators have used a turbidimetric technique for molecular weight studies which is similar in a general way to the thermal gradient preparative method. This is done by studying the solubility of polymer fractions as a function of temperature. This is the same general technique as employed in the present invention. As the solution is cooled the high molecular weight fractions or species first become insoluble and separate out, causing a small amount of turbidity. As the temperature continues to decrease, increasing amounts of the polymers are precipitated out, according to their molecular weight, as previously described. Ultimately a point is reached, at least in the ideal case, at which the fraction or species of lowest molecular weight becomes insoluble in the solution. In practice, it may be difficult to measure the very last traces of polymer, but this is usually unimportant where the method is otherwise reproducible. At this last point of cooling the turbidity is greatest and in the ideal situation all of the polymer fractions will have been precipitated, though remaining in suspension as very fine particles. As the increase in turbidity is plotted against the decrease in temperature, a cumulative graph or plot may be obtained which simply portrays cumulative turbidity vs. temperature but which, in effect, shows cumulative weight percentage of precipitate vs. molecular weight. This is based on the assumptions that the increase in turbidity is related directly to the cumulative weight percentage, and that the molecular weight decreases linearly according to the decrease in temperature. If the latter function is not linear it can readily be evaluated experimentally and the functional relationship suitably adjusted.

For carrying out the polymer analyzing process just described, the specific apparatus of the present invention, as described in detail below, was developed. It involves use of a photoelectric turbidimeter to be used with appropriate temperature controlling means for measuring the precipitation rate of various polymeric fractions such as fractions of the poly-alpha olefins. A good example is use in testing the polydispersity of ethylene-propylene copolymers. It will, of course, be understood that the instrument may be used for various other purposes, as previously suggested.

This instrument consists basically of a light source, an arrangement for passing light through a sample, and a photoelectric cell. A recording system is provided and the necessary electric circuitry is included for directly measuring changes in turbidity as a function of some other variable such as temperature. A recording device, for example a conventional X-Y recorder, is used to plot the degree of turbidity vs. the temperature. The latter is decreased or increased at a controlled rate. To study polymeric weight distribution, a decreasing temperature is used. A parameter from the plot so obtained may be correlated with molecular weight distribution, or polydispersity, which, in turn, may be determined by the thermal gradient elution technique. Once the parameter is determined and correlated, one or many samples can be analyzed with an entirely satisfactory degree of accuracy.

The method of the present invention reduces the elapsed time of the analysis far below that required for most analytical methods. This makes it possible to run molecular weight distribution tests often enough to control polymer plant operation with a high degree of precision. A series of tests has demonstrated that the results are reproducible to quite a high degree of accuracy. The accuracy is quite adequate for plant control purposes.

The invention will be more fully understood by referring to the drawings and to a detailed description thereof. In the drawings.

Figure 1:
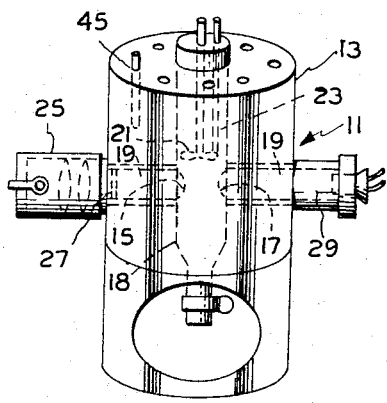
FIGURE 1 is a front view of a preferred form of a cell or turbidimeter apparatus made according to the present invention.

Referring first to FIGURE 1, the apparatus there shown includes a temperature controlling cell block indicated generally at 11. The cell itself is a tube 18 of corrosion resistant material, such as stainless steel or Monel metal, mounted in a highly heat-conductive block, e.g., a copper block 13 of substantial mass. The cell 18 mounted inside the block is equipped with a pair of oppositely positioned quartz glass windows 15 and 17. The cell is adapted to receive an adequate sample of the polymer to be tested. The polymer is normally in solution, being pre-dissolved in a suitable solvent.

The copper block 13 is sufficiently massive to insure closely controllable changes of temperature within the cell 11 when the copper block has its own temperature changed purposely. Any suitable heating or cooling means may be applied to the copper block 13, a preferable arrangement being shown in FIGURES 7 and 8 and described in more detail below. If desired, the block may be heated or cooled by wrapping it with a hollow tubular coil through which a heat exchange fluid, such as water or Dowtherm, may be circulated. It is preferable, however, to pass the heat exchange fluid through the block itself. Alternatively, electric heaters, e.g. of the common resistance type, may be built in and/or around the copper block which surrounds the cell cavity. For a versatile apparatus, the block is provided with both heating and cooling means. Preferably, the block 13 is cooled by circulating water through a network of holes drilled through the block and mutually interconnecting. Electric heating means are included also. The liner or cell 18, of corrosion resistant metal such as stainless steel, is inserted in the copper block. Block 13 may be cast, with the liner 18 inserted in the mold before casting. Cell 18 is preferably all metal except for two openings provided to receive a pair of quartz windows 15 and 17. The latter are fitted therein so light can pass through. In a typical apparatus which has been used successfully, the cell 18 has a capacity of about 27 ml., although this capacity may be varied widely. The system thus provides for even, rapid heat transfer to and from the material in the cell.

Passageways 19 allow light to pass through windows 15 and 17. These windows are held in place by bushings and are sealed with appropriate gaskets which are resistant to wide temperature variations. Material such as Teflon may be used for the gaskets, being very suitable for this purpose. Preferably, the copper block 13 is also surrounded by insulation not shown in the drawings. The block is also preferably provided with an aluminum wrapper or shield outside of the insulation for further control of temperature within. A small motor-driven stirrer 21 is fitted into a standard 24/40 taper opening in the top of the cell. This stirrer is useful to facilitate dissolving of solids in liquids in the cell 18. It may also be needed at times to maintain a suspension of solid particles. A thermocouple 23 is suspended alongside the stirrer, being mounted to measure continuously the temperature of the solution.

A sensitive optical system is provided, consisting of a microscope type light assembly 25 as a light source, an iris diaphragm 27, and a photo cell or sensing element 29. The photo-sensitive element is preferably mounted in a good insulating material, such as a heat-resistant plastic, for example Bakelite or Micarta. The light source is rigidly supported on the block 13 to prevent relative movement which otherwise might occur because of movement in the plastic connector between the block 13 and the iris 27.

Figure 2:
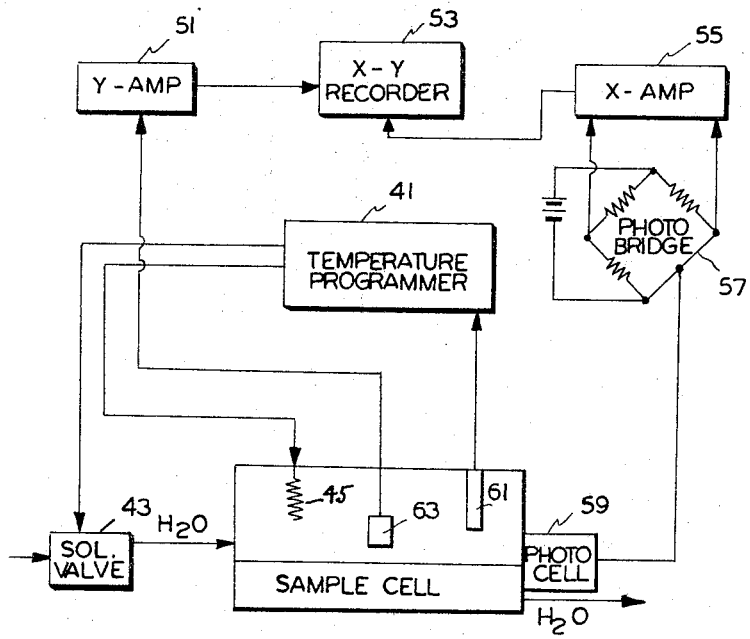
FIGURE 2 is a schematic illustration, together with a wiring diagram in simplified form, of the complete apparatus, including external instruments as well as the structure of FIGURE 1.

An electronic controller or programmer, not shown in FIGURE 1, is provided to activate and control both the heaters and the water supply control valve, thereby to maintain the temperature or temperature gradient which is desired. Such a temperature gradient may be predetermined and maintained by proper adjustment of a control potentiometer. As shown in FIGURE 2, a temperature programmer 41 is connected to a solenoid valve 43 which controls the flow of water. It is connected also to heater units 45. Only one of these is shown in FIGURE 1, but it represents diagrammatically all the heating elements for the copper block previously mentioned. See also FIGURES 7 and 8 and the description below.

As shown in FIGURE 2, an amplifier 51 is provided with its output connected to a conventional X–Y recorder 53. Amplifier 51 controls movement of the recorder along the Y-axis of a chart such as that shown in FIGURE 3. Another amplifier 55 controls its movement along the X-axis. A Wheatstone bridge circuit 57 operates under control of the photoelectric sensing element 59 to control amplifier 55. A temperature sensing element associated with block 13 is indicated generally at 61. It is used to control on program the heating and cooling of the block. A temperature measuring thermocouple at 63, also associated with block 13, gives the millivolt signal which is fed into the Y-amplifier for recording. These elements 61, 63 preferably are placed within block 13 so as to maintain close contact with the cell 11 which contains the test sample.

In operation of the apparatus so far described, the temperature signal for the recorder comes from the thermocouple 63. The turbidity signal is obtained from the photoelectric cell through the bridge circuit just described. Electrical adjustments in the circuit are provided for, making it possible to select any desired level of sensitivity.

Figure 3:
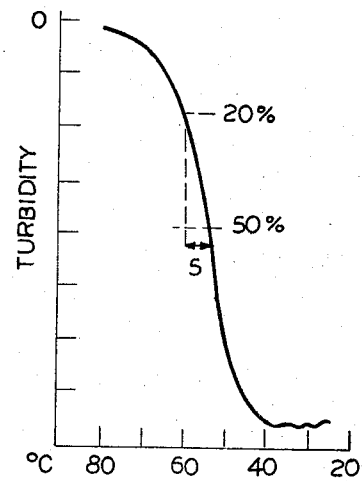
FIGURE 3 illustrates a typical X-Y recorder chart of a type obtainable with the apparatus of FIGURES 1 and 2.

Referring next to FIGURE 3, there is shown a typical temperature-turbidity graph. The plot has a general S-shape, resembling one of the integral molecular weight distributions generally expected in a cumulative distribution system. It will be noted that in the middle of the S-shaped plot the slope is essentially constant and can be represented fairly accurately by a straight line. Various samples having different molecular weight distributions will show some different slopes at this middle straight line portion of the curve. Such also may show different shapes on the two ends, but, as a family, the curves bear general similarity for many materials, especially for hydrocarbon polymers of common types.

In a test case, a parameter or study zone was chosen based on the difference in temperature between two points which represented respectively 20 percent and 50 percent of the maximum turbidity. As shown in FIGURE 3 this portion of the curve was essentially linear.

For measuring polydispersity, the parameter S may be correlated with a parameter determined from the Wesslau equation given below, $$I(M) = \frac{1}{\beta\sqrt{\pi}} \int_{-\infty}^{\ln M} \exp\left(-\frac{1}{\beta}\cdot\ln^2 \frac{M}{M_o}\right) d\ln M$$

where $I(M)$ = an integral distribution function. $\beta$ is related to the width of the distribution. $M_o$ is equal to the molecular weight at the midpoint of the probability curve. Wesslau has shown that $\beta$ is related to the polydispersity in the following manner.

$$\frac{\overline{M}_w}{\overline{M}_n} = \exp\frac{\beta^2}{2}$$

Values of $\beta$ determined from analysis of fractionation data plotted against S yield a calibration curve by which unknown samples may be analyzed.

Polymer studies which have been made by this technique include studies on polypropylene, polyethylene, polybutylenes, and ethylene propylene copolymers. Reference will be made specifically to the ethylene propylene copolymers (EPR). The samples studied were selected from commercial EPR copolymers, as well as some laboratory prepared copolymers. These had been previously fractionated, using prior art thermal gradient-elution techniques. Results by the present method were found to be entirely satisfactory.

In fractionation studies, a heptane-ethanol solvent/non-solvent system commonly has been used for EPR copolymers in the prior art. However, this system forms an azeotrope which boils below the boiling point of either component. Such a material therefore is not well suited to the turbidimetric technique of the present invention because it gives a narrower working temperature range. A heptane-butanol system also forms an azeotrope and is likewise not satisfactory. A heptane-normal propanol system was chosen for the particular studies with EPR discussed herein. It does not form an azeotrope and therefore avoids the problem raised by azeotropes. It also has a good working temperature range of about 25–80° C.

Figure 4:
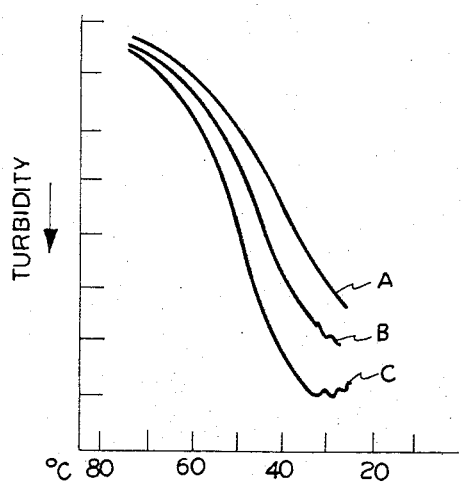
FIGURE 4 is another chart showing the effect of polymer concentration on turbidity when tested according to the method of the present invention.

Generally speaking, the effective working temperature range for polymer solutions of this type is rather narrow, for example between about 25 and 80° C., as just suggested. Because of this rather narrow range, the effect of polymer concentration has been studied carefully to provide a suitable basis for investigation. As shown in FIGURE 4, changes in polymer concentration do not seriously affect the regularity of the curves at higher temperatures. In an ethylene-propylene copolymer system, when the temperature is brought below 45° C., some irregularity is observed. This irregularity increases as concentration increases, as is seen by comparing sample C with sample A, FIGURE 4. This phenomenon is probably due to coagulation of the polymers.

In using the instrument of this invention, it is desirable first to make a blank run on the solvent without adding any polymers. If the instrument is operating properly there should be no substantial deviation from a horizontal line in the recorded chart during the blank run. In such case it may be assumed that errors will not be introduced by the instrument itself. Thereafter, tests may be run as will next be discussed.

EXAMPLE I

A sample of ethylene-propylene copolymer (0.125 gram) was dissolved in 50 ml. of heptane. The resulting solution was cooled to room temperature. 20 ml. of the solution was then transferred to a beaker by means of a pipette. To this beaker was added 9 ml. of normal propanol and the turbid solution or suspension which resulted was stirred until thoroughly uniform. Enough of the resulting turbid solution was immediately poured into the cell that the level of the liquid was just below the tapered fitting of the stirring assembly. The stirring assembly was then replaced in the apparatus and the motor of the stirrer was started. The heaters were turned on and the cell was allowed to warm up. When the temperature reached 80° C. and the polymer was entirely dissolved, the stirrer was then turned off and the cooling rate switch was actuated. This caused the temperature programmer to take over automatic control. The solution was cooled at a rate of 2.89° C. per minute. Temperature and turbidity were simultaneously recorded on a chart. When the temperature reached 25° C., the chart was removed from the instrument and the 20 and 50 percent points of maximum turbidity were calculated. The temperature difference, represented by the difference in these two turbidities, was taken as the parameter S and correlated with the term β from the Wesslau equation given above. A graph was obtained as illustrated in FIGURE 4, three different samples being tested. The value of β was determined independently from fractionation data. An excellent correlation coefficient of 0.97 was obtained.

Figure 5:
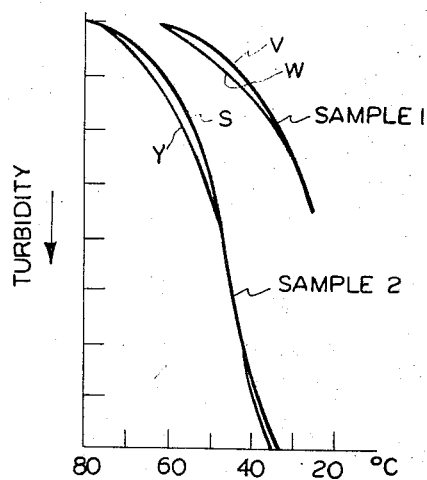
FIGURE 5 is another chart showing the good reproducibility of the system on repetitive testing.

FIGURE 5 shows the effect of separate tests on two identical samples of EPR copolymers. The instrument showed excellent reproducibility, as is evident from this graph. Compare lines $r$ and $s$ on the first curve and $u$ and $v$ on the second.

These curves were obtained as follows. Another polymer solution was prepared as in Example I above, the solution being placed in the cell and the block heated while stirring, until solution was complete. Thereafter the temperature was lowered in the same manner as described in Example I. Turbidity increased rapidly during the cooling cycle and was recorded. At the end of the cooling cycle the same solution was reheated and stirred until all the polymer was again dissolved. The cooling cycle was then repeated and the turbidity was measured and recorded in the same manner as on the first cooling cycle. The excellent reproducibility is shown by the near coincidence of the curves. This is considered very satisfactory.

To determine overall experimental reproducibility, three separate samples of different compositions were dissolved and carried through the entire test procedure, as in Example I. The reproducibility of the resulting graph (not shown) was considered excellent. Longer range tests also were carried out to demonstrate reproducibility on a commercial sample of ethylene-propylene copolymer which was analyzed at intervals over a three- to four-month period. In this case the poly-dispersity test $\overline{M}_w/\overline{M}_n$ was calculated and the results were as follows:

| Run: | $\overline{M}_w/\overline{M}_n$ |
| --- | --- |
| 1 | 8.4 |
| 2 | 8.5 |
| 3 | 8.4 |
| 4 | 8.4 |
| 5 | 8.4 |
| 6 | 8.4 |

Figure 6:
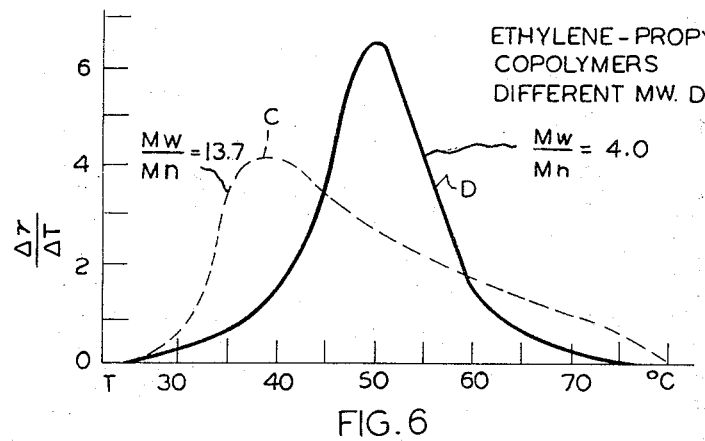
FIGURE 6 is a chart which illustrates a typical differentation curve and a photoelectric turbidimetric plot made in analyzing ethylene-propylene copolymers for different molecular weight distributions.

FIGURE 6 shows differential turbidity curves which were derived from photoelectric turbidimeter plots testing two different samples C and D of ethylene-propylene copolymers of different molecular weight distribution.

Figure 7:
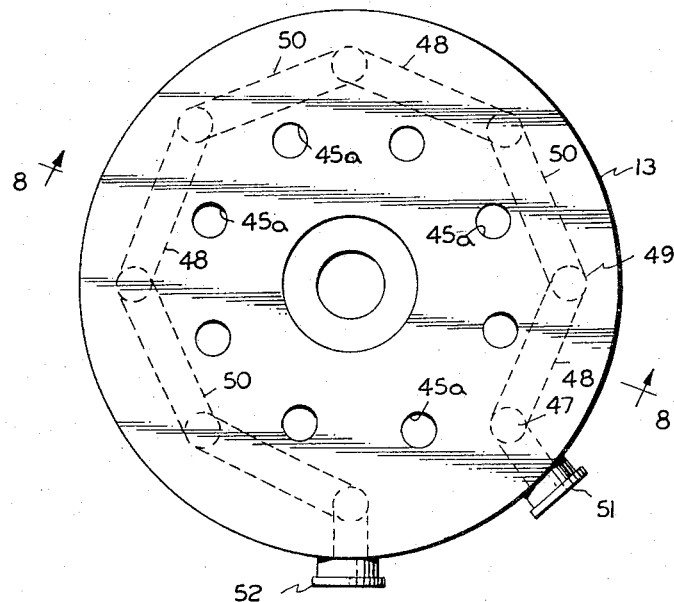
FIGURE 7 is a plan view of the basic test cell block of FIGURE 1, showing heating and cooling means.
Figure 8:
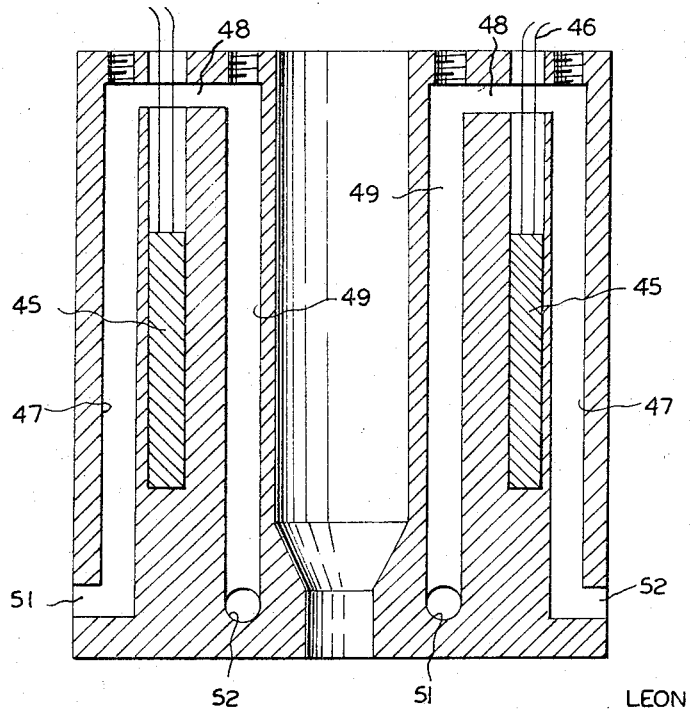
FIGURE 8 is a side view of the structure of FIGURE 7.

Referring to FIGURES 7 and 8, it will be seen that the copper block is preferably bored or cast in such a way as to provide necessary openings to receive heating elements and cooling fluids for effective and uniform temperature control. The block, as shown, is provided with a series of uniformly spaced vertical bores 45A, each of which receives a separate resistance type electric heating element 45. Wiring is not shown except at 46, FIGURE 8, being conventional as will be well understood by those skilled in the art.

The block also is provided with interconnected bores 47, 48, 49, 50 as shown in FIGURES 7 and 8, to receive a heat exchange fluid, preferably water, for cooling. These bores may be formed in casting the block or, if desired, they may be drilled and plugged at appropriate points to provide the desired labyrinth or tortuous path of flow for good temperature control. One or more inlets 51 and a similar number of outlets 52 may be provided, as shown. Preferably the vertical cooling channels are fitted in between and run more or less parallel with uniformly spaced heaters.

The invention thus comprises a number of features of importance, including the following:

(a) A massive temperature controlling block of material having a high coefficient of heat transfer, such as copper (silver may be used, and also aluminum in some cases).

(b) A cell within the block and in close heat transmitting relationship therewith, of thin corrosion-resistant metal, preferably stainless steel. Monel metal, etc., may be used in some cases, but stainless steel is preferable.

(c) A drain cock in the cell to facilitate multiple tests.

(d) Windows of suitable material (preferably quartz) to facilitate transmission of light of a wide wave length range. This is particularly important where a wide variety of materials is to be tested.

(e) A light source. This may be a monochromatic light for some tests or a diffuse or wide band light for others. A wide range of variations in types of light sources may be needed to realize the full use of the instrument.

(f) A photocell. For some purposes a light-sensitive resistor is at least as useful as the photocell.

(g) A stirring mechanism for the material in the cell.

(h) A recording thermocouple in or closely associated with the cell.

(i) A temperature-sensing element in the block. Preferably this element is close to the cell to give accurate indications of cell temperature.

(j) A series of heating elements in the block, preferably rather closely and uniformly spaced, to keep temperature quite uniform throughout.

(k) A cooling channel designed to maintain a uniform gradient of temperature throughout the block during cooling. This is preferably accomplished by placing the vertical channels at uniform distances; especially is it preferred to place them about midway between adjacent pairs of heating elements.

(l) An externally located temperature programming device for controlling the rate and uniformity of cooling or heating gradient.

The instrument and its method of operation are relatively simple. The equipment is easy to operate and is highly satisfactory for general analysis of molecular weight distribution in polymers of suitable solubility in commercial solvents. Without change in structure, or with only very minor changes which will be obvious, the apparatus and the method of this invention may be applied to other analyses and studies such as those mentioned above.

It will be obvious that variations may be made in the apparatus and in its method of use, and it is intended by the claims which follow to cover such variations as would readily occur to those skilled in the art as broadly as the prior art properly permits.

What is claimed is:

1. In apparatus of the character described, the combination which includes a transparent sample container, a metal holder of high thermal conductivity for holding and controlling the temperature of a sample solution in said container, means associated with said holder for stirring said solution, means for progressively varying the temperature of said metal holder, means on said holder for passing light through said holder and said container means also on said holder for measuring the light transmitted through said container, and means for continuously and automatically recording temperature and light measurements to produce a temperature-turbidity chart indicative of the change of light transmission through the material in said solution, with changes in temperature.

2. Combination according to claim 1 wherein temperature control is obtained by flowing a heat exchange liquid through said holder and electrically controlling said flow to obtain a substantially constant temperature gradient.

3. A method for analyzing the molecular weight distribution of a polymeric material which comprises placing a sample of said material in a solvent/non-solvent liquid mixture wherein the material as a whole is marginally soluble or nonsoluble depending upon the temperature, adjusting the temperature and agitating the mixture to completely solubilize the sample material, thereafter progressively changing the temperature in a direction to throw more and more of said material out of solution, and automatically measuring and recording, against temperature, the turbidity of the solution to determine the relative proportions of insoluble material present at various temperatures.

4. Method according to claim 3 wherein the solvent/non-solvent mixture comprises a hydrocarbon and an alcohol.

5. An apparatus for analyzing the molecular weight distribution of a sample of polymeric material which is relatively soluble in a solvent at relatively high temperatures and relatively insoluble at low temperatures, comprising in combination:
  (a) a temperature controlling block, said block defining a plurality of interconnected cooling channels;
  (b) a metal cell for containing said sample, said cell located within said block and in close heat transmitting relationship therewith;
  (c) quartz windows located in the walls of said cell and said block for passing light through both said cell and said block;
  (d) means located on said block for measuring the light transmitted through said cell; and
  (e) means for continuously and automatically recording temperature and light measurements to produce a temperature-turbidity chart indicative of the changing light transmission through the sample.

6. An apparatus of the character described comprising in combination, a temperature controlling block, a sample cell within the block and in close heat transmitting relationship therewith, quartz windows located within the walls of said cell and said block, said windows allowing the passage of light through said cell and said block, a light source located on said block, a photocell also located on said block for receiving light passed through said cell and the sample therein, a recording thermocouple in said cell, a temperature-sensing element in said block, a series of heating elements in said block uniformly spaced to keep the temperature of the block uniform there throughout the block during cooling, a temperature pronels to maintain a uniform gradient of temperature throughout the block durnig cooling, a temperature programming device for controlling the rate and uniformity of cooling and heating gradients, and means for continuously and automatically recording temperature and light measurements to produce a temperature-turbidity chart indicative of the changing of light transmission through the sample.

References Cited
UNITED STATES PATENTS

| | | | |
|---|---|---|---|
| 2,959,665 | 11/1960 | Rhees | 250—218 |
| 2,960,910 | 11/1960 | Pelavin | 250—218 |
| 3,045,125 | 7/1962 | Mason | 250—238 |
| 3,060,318 | 10/1962 | Ouvrard | 73—53 |
| 3,090,222 | 5/1963 | Akaboshi et al. | 73—17 |
| 3,188,857 | 6/1965 | Vesper et al. | 73—5.3 |
| 3,254,965 | 7/1966 | Ogle | 23—285 |
| 3,286,510 | 11/1966 | Parker | 73—5.3 |

WALTER STOLWEIN, *Primary Examiner.*